(12) United States Patent
Yoshida

(10) Patent No.: US 8,656,743 B2
(45) Date of Patent: Feb. 25, 2014

(54) POROUS GLASS PREFORM PRODUCTION APPARATUS

(75) Inventor: Makoto Yoshida, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 559 days.

(21) Appl. No.: 12/550,336

(22) Filed: Aug. 28, 2009

(65) Prior Publication Data

US 2010/0050695 A1 Mar. 4, 2010

Related U.S. Application Data

(63) Continuation of application No. PCT/JP2007/053840, filed on Feb. 28, 2007.

(51) Int. Cl.
*C03B 37/014* (2006.01)

(52) U.S. Cl.
USPC .......................................................... 65/414

(58) Field of Classification Search
USPC .......................................................... 65/414
See application file for complete search history.

(56) References Cited

U.S. PATENT DOCUMENTS

| | | | |
|---|---|---|---|
| 2002/0043079 A1 | 4/2002 | Inoue et al. | |
| 2004/0079119 A1 | 4/2004 | Fukutani et al. | |
| 2005/0210925 A1 | 9/2005 | Inoue et al. | |
| 2007/0209397 A1 | 9/2007 | Otosaka | |

FOREIGN PATENT DOCUMENTS

| | | |
|---|---|---|
| CN | 1496968 A | 5/2004 |
| JP | 56007729 U | 1/1981 |
| JP | 03-109221 A | 5/1991 |
| JP | 06316422 A * | 11/1994 |
| JP | 11-268926 A | 10/1999 |
| JP | 2002-193633 A | 7/2002 |
| JP | 2004-161606 A | 6/2004 |
| JP | 2005-281025 A | 10/2005 |
| JP | 2007-210837 A | 8/2007 |
| TW | I237624 B | 8/2005 |

OTHER PUBLICATIONS

Machien translation of JP 11-268926,Goto et al., Production of Optical Fiber Preform, Oct. 5, 1999.*
International Search Report (ISR) for PCT/JP2007/053840 for Examiner consideration.
Written Option (PCT/ISA/237) of PCT/JP2007/053840.
Chinese Office Action dated Sep. 9, 2011, in a counterpart Chinese patent application No. 200780051856.X, Partial translation of the Office Action is attached as a concise explanation of relevance.

* cited by examiner

*Primary Examiner* — Queenie Dehghan

(57) ABSTRACT

A porous preform production apparatus having a reaction vessel which includes an upper deposition chamber having an air supply inlet and an exhaust outlet, a lower deposition chamber having an air supply inlet, and a top chamber disposed on top of the upper deposition chamber and adapted to lift and store a porous preform formed by deposition, characterized in that the floor of the upper deposition chamber is disposed at a height between the lower end of a straight body part and the deposition tip of the porous glass preform during deposition, and a connection opening which connects the upper deposition chamber with the lower deposition chamber, is provided on the floor of the upper deposition chamber, and that when the aperture diameter of the connection opening is designated as A and the diameter of the porous preform passing through the connection opening as B, the ratio B/A satisfies the expression $0.05 \leq B/A \leq 0.6$.

7 Claims, 5 Drawing Sheets

POROUS GLASS PREFORM PRODUCTION APPARATUS

CROSS REFERENCE TO RELATED APPLICATION

This is a continuation application of PCT/JP2007/053840 filed on Feb. 28, 2007, the contents of which are incorporated herein by reference.

BACKGROUND

1. Technical Field

The present invention relates to a porous glass preform production apparatus for producing a large glass preform used in the production of optical fibers (hereinafter, simply referred to as "optical fiber preform"), particularly by depositing glass microparticles generated by a flame hydrolysis reaction of the raw materials for glass in a burner flame. In the designated countries where incorporation of documents by reference is approved, the content described in the specification of the following patent application is incorporated into the present patent application by reference, and will be regarded as a part described in the present specification. Japanese Patent Application No. 2006-032686. Date of filing: Feb. 9, 2006

2. Related Art

The VAD method is a well known method for producing an optical fiber preform. In this method, a porous glass preform including a core layer and a cladding layer (hereinafter, simply referred to as a "porous preform") is produced by fitting a starting member on a shaft supported by the upper structure of an apparatus, which the shaft elevates while rotating, so that the starting member is lowered into a reaction chamber, and depositing glass microparticles which have been generated by a core deposition burner and a cladding deposition burner installed in the reaction chamber, on the tip of the starting member.

The generated glass microparticles are not all deposited, and unattached glass microparticles which have not been deposited are generated throughout the production. Most of these unattached glass microparticles are discharged, together with other gases such as exhaust gas, from an exhaust outlet provided in the reaction chamber.

However, a portion of the glass microparticles attach to the ceiling or sidewalls of the reaction chamber, during the period from being generated in the burner flame to being discharged. There have been cases where these glass microparticles attached and deposited on the ceiling or sidewalls exfoliate and fall down to attach on a porous preform during the production, thereby causing the generation of air bubbles or foreign materials in the optical fiber preform after vitrification.

Recently, cost reduction has been demanded, and enlargement of optical fiber preforms has become an urgent issue. In order to increase the size of an optical fiber preform to be produced, the feed amount of raw materials must be increased. However, if the feed amount of raw materials is increased, the amount of excess glass microparticles which have not deposited increases, even though the deposition efficiency does not change. As a result, the frequency for the glass microparticles attached on the inner walls of the reaction chamber to exfoliate and fall down, also increases.

In order to solve such problems, Japanese Patent Application Publication No. 2002-193633 discloses a method for reducing glass microparticles, that is, soot, which attach to the ceiling, by providing a slit-shaped air supply inlet on the sidewall surface of the reaction chamber where a burner is installed, in the vicinity of the ceiling of the sidewall, and providing exhaust outlets on the sidewall surface which is opposite to this air supply inlet.

However, the method disclosed in JP 2002-193633 cannot avoid the attachment of soot to the ceiling which comes in contact with the back of the porous preform as viewed from the air supply inlet side, and thus it is difficult to solve the problem of exfoliation of deposited soot. Therefore, when attempting to avoid the attachment of soot by increasing the exhaustion efficiency and thereby increasing the amount of supplied exhaust, there occur new problems such as that the airflow in the chamber is disturbed, and the flame of the core deposition burner is disturbed, so that the deposition does not occur stably. There are also problems that striae are generated in the resulting optical fiber preform, or the optical properties in the length direction fluctuate.

SUMMARY

It is an object of the invention to provide an apparatus for producing a porous preform by a VAD method, where the apparatus has a high efficiency of discharge of glass microparticles which have not attached to the porous preform, and can stably deposit glass microparticles without disturbing the airflow in the chamber, so that the generation of air bubbles or foreign materials occurs less. The above and other objects can be achieved by combinations described in the independent claims. The dependent claims define further advantageous and exemplary combinations of the innovations herein.

According to a first aspect related to the innovations herein, one exemplary porous glass preform production apparatus may include a porous glass preform production apparatus for producing a porous preform by supplying raw materials for glass, a combustible gas and a combustion supporting gas to burners, and depositing glass microparticles generated by a flame hydrolysis reaction of the glass raw materials, the apparatus comprising a reaction vessel which includes an upper deposition chamber having an air supply inlet and an exhaust outlet, a lower deposition chamber having an air supply inlet, and a top chamber disposed on top of the upper deposition chamber and adapted to lift and store a porous glass preform formed by deposition, wherein a floor of the upper deposition chamber is disposed at a height between a lower end of a straight body part and a deposition tip of the porous glass preform during deposition, a connection opening which connects the upper deposition chamber with the lower deposition chamber is provided on the floor of the upper deposition chamber, and when the aperture diameter of the connection opening is designated as A and the diameter of the porous glass preform passing through the connection opening as B, the ratio B/A satisfies the expression $0.05 \leq B/A \leq 0.6$.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

As a result of devoted investigation, it was found that in order to increase the efficiency of discharge of unattached glass microparticles, and to stabilize the flame of the deposition burner even in the case where the airflow inside the chamber has become rapid, the height of the aperture of the connection port of the upper and lower deposition chambers and the condition of the aperture diameter are important. The present invention has clarified these conditions.

Hereinafter, the invention will be described with reference to FIGS. 1 to 6.

Figure 1:
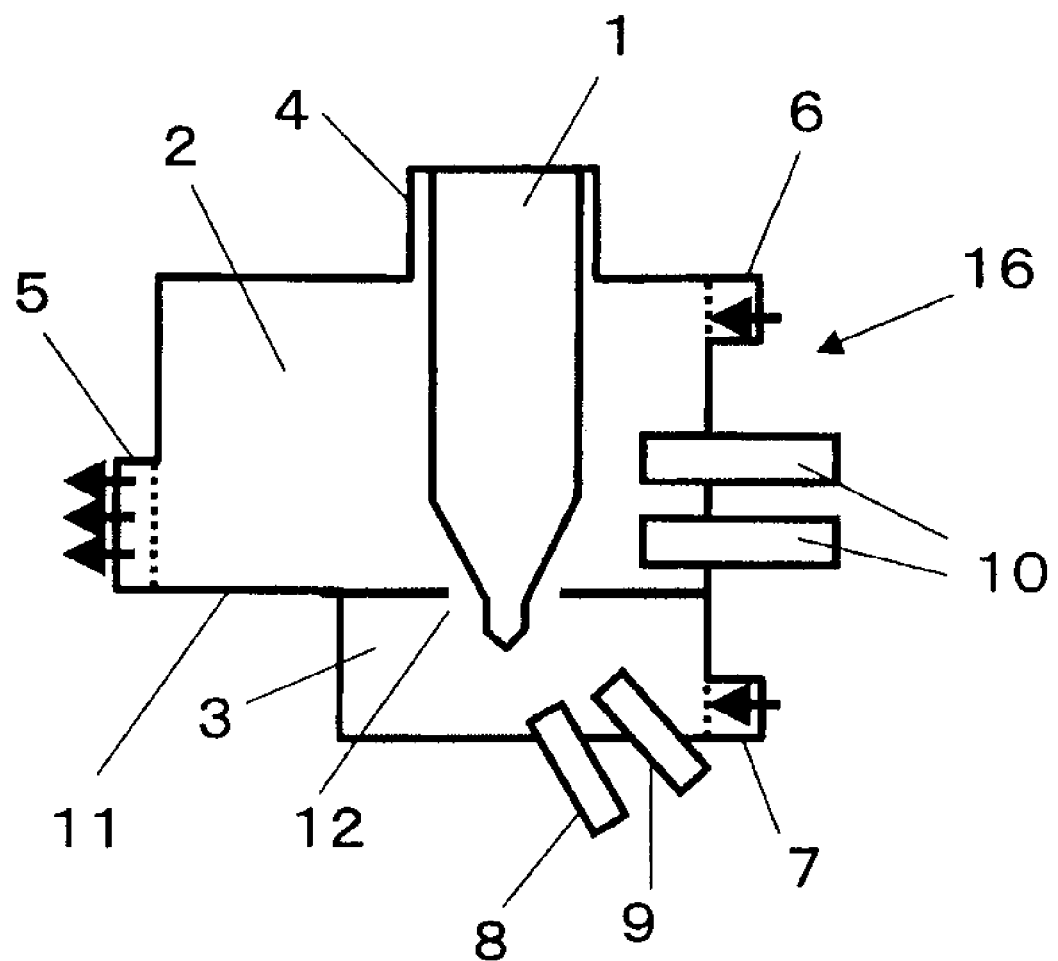
FIG. 1 is a vertical cross-sectional view schematically showing the production apparatus of the invention.

FIG. 1 is a vertical cross-sectional view schematically showing the production apparatus of the invention. The production apparatus for a porous preform 1 includes a reaction vessel 16. The reaction vessel 16 includes an upper deposition chamber 2 having an exhaust outlet 5 and an air supply inlet 6, a lower deposition chamber 3 having an air supply inlet 7, and a top chamber 4 which is disposed on top of the upper deposition chamber 2 and lifts and stores the porous preform 1 formed by deposition. The floor 11 of the upper deposition chamber 2 is provided at a height between the lower end of a straight body part 13 and a deposition tip part 14 of the porous preform 1 during deposition, and a connection opening 12 for connecting the upper deposition chamber 2 and the lower deposition chamber 3, is provided on the floor of the upper deposition chamber 2.

Furthermore, in the porous preform 1, the core is deposited by a core deposition burner 8 of the lower deposition chamber 3, and a portion of cladding is deposited by a cladding deposition burner 9. In the upper deposition chamber 2, the cladding is deposited by a cladding deposition burner 10 until the cladding obtains a predetermined diameter.

Figure 2:
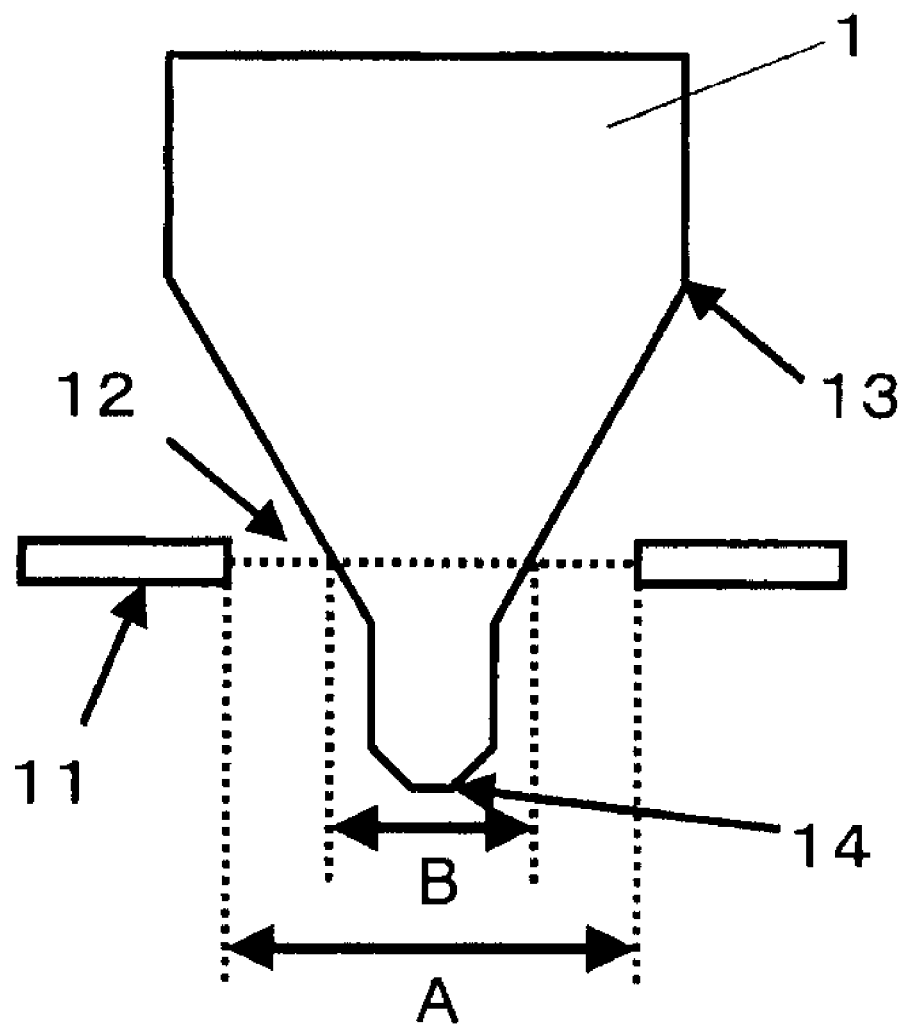
FIG. 2 is an extended schematic vertical cross-sectional view showing the relationship between the aperture diameter of the connection opening and the diameter of the porous preform.

FIG. 2 is an extended schematic vertical cross-sectional view showing the relationship between the aperture diameter of the connection opening 12 and the diameter of the porous preform 1. The connection opening 12 is provided such that when the aperture diameter of the connection opening 12 is designated as A, and the diameter of the porous preform 1 passing through the connection opening 12 as B, the ratio B/A satisfies the expression 0.05≤B/A≤0.6. Also, since the porous preform 1 is lifted along with the growth of the porous preform due to deposition, the diameter B of the porous preform 1 passing through the connection opening 12 is held almost constant during the production.

Accordingly, a regular airflow is formed along the shape of the porous preform 1, over the tip to the straight body part of the porous preform 1. As a result, even in the case of increasing the amounts of air supply and exhaustion at the upper deposition chamber 2 in order to increase the efficiency of discharge of any unattached excess glass microparticles, the frequency of the airflow in the upper deposition chamber 2 intruding into the lower deposition chamber 3, can be effectively reduced, and thus the flame of the core deposition burner 8 can be stabilized. Furthermore, attachment of excess glass microparticles in the vicinity of the connection opening 12 between the upper deposition chamber 2 and the lower deposition chamber 3 can be suppressed. Furthermore, when the ratio B/A is less than 0.05, the frequency of the disturbed airflow in the upper deposition chamber 2 intruding into the lower deposition chamber 3 increases. When the ratio B/A exceeds 0.6, it becomes easy for any unattached glass microparticles generated in the lower deposition chamber 3 to attach to the connection opening 12 because the gap between the porous preform 1 and the connection opening 12 is narrow.

It is preferable that the distance from the center of the connection opening 12 to the inner wall of the upper deposition chamber 2 be A or more, and the distance from the center of the connection opening 12 to the inner wall of the lower deposition chamber 3 be 0.7 A or more. Accordingly, even in the case where the airflow of the upper deposition chamber 2 flows into the lower deposition chamber 3, since the internal capacity of the lower deposition chamber 3 is large, the large capacity serves as a buffer, and it becomes possible to reduce the influence of the airflow on the flame of the core deposition burner 8. Furthermore, when the distance from the center of the connection opening 12 to the inner wall of the upper deposition chamber 2 is set to A or more, the feed amount of raw materials is increased along with the enlargement of optical fiber preforms, and even in the case where excess glass microparticles have increased, the attachment of excess glass microparticles to the inner wall of the upper deposition chamber is effectively suppressed.

Figure 3:
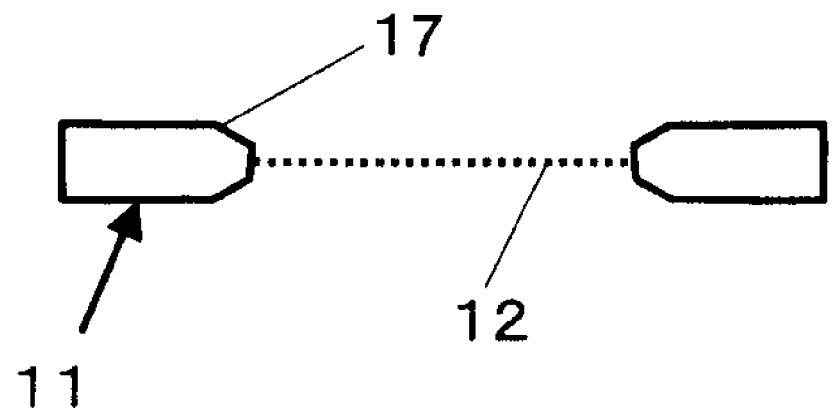
FIG. 3 is a schematic vertical cross-sectional view showing an example of performing chamfering at the aperture of the connection opening.
Figure 4:
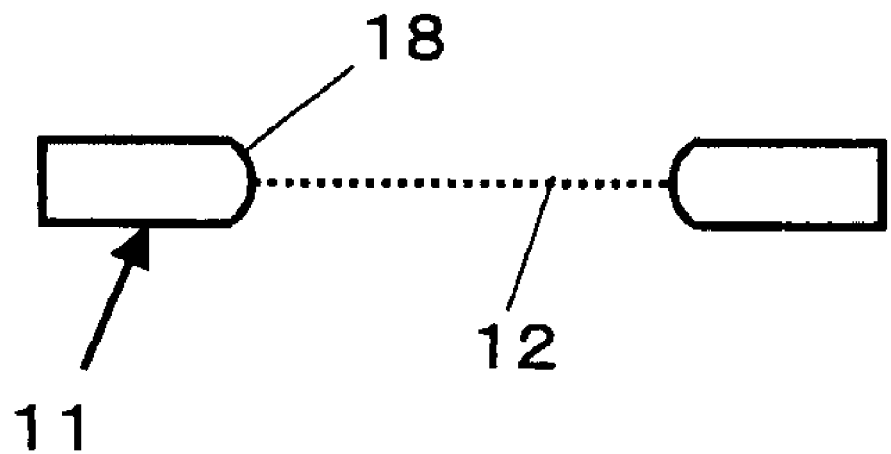
FIG. 4 is a schematic vertical cross-sectional view showing an example of performing curved surface processing at the aperture of the connection opening.

Since the airflow contains glass microparticles which did not attach to the porous preform, glass microparticles also attach and deposit on the connection opening 12 through the airflow passing through the connection opening 12. As shown in FIG. 3, by providing chamfering 17 or a curved surface 18 to the inner surface of the connection opening 12, attaching and growing of excess glass microparticles on the inner surface of the connection opening 12 can be suppressed. FIG. 3 shows an example of performing chamfering 17 on the aperture of the connection opening 12 provided on the floor part of the upper deposition chamber 2, and FIG. 4 shows an example of providing a curved surface 18 to the aperture of the connection opening 12.

Figure 5:
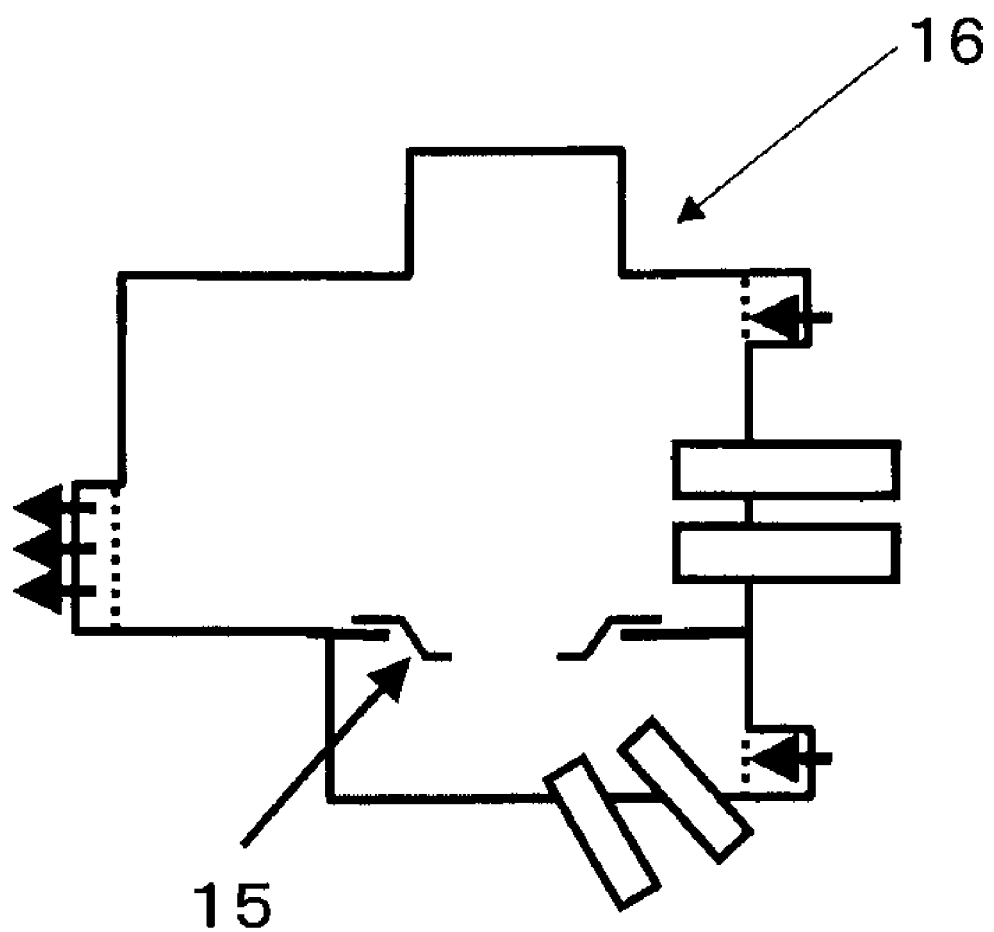
FIG. 5 is a schematic vertical cross-sectional view showing an example of the production apparatus having a separable connection opening.

Furthermore, as an example shown in FIG. 5, cleaning or washing can be simply performed by providing a separable-type connection opening 15 that enables the part constituting the connection opening 12 to be separated and exchanged. Also, by exchanging the parts of the apparatus, it becomes possible to simply change the aperture diameter or the height of the connection opening 12 in accordance with the size of the porous preform to be produced, without exchanging the reaction vessel 16.

Figure 6:
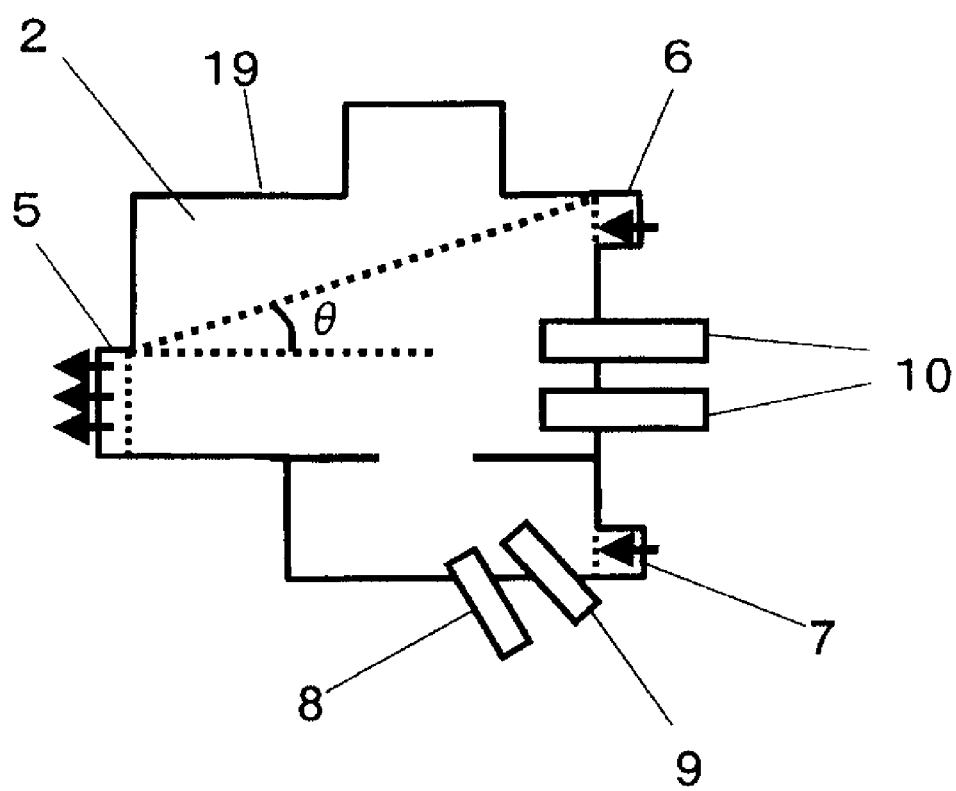
FIG. 6 is a schematic vertical cross-sectional view showing the relationship between the exhaust outlet and the air supply inlet.

As shown in FIG. 6, when the exhaust outlet 5 and the air supply inlet 6 are provided such that the angle θ satisfies 5 degrees≤θ≤50 degrees, wherein θ represents the angle of view made from the upper end of the exhaust outlet 5 to the upper end of the air supply inlet 6 provided on the opposite wall of the burner side in upper deposition chamber 2, any excess glass microparticles not attached to the porous preform 1 can be discharged through the exhaust outlet 5 without allowing the glass microparticles to reach the ceiling 19 on the exhaust outlet side, and any excess glass microparticles that attach to the ceiling contacting the rear side of the porous preform 1 when viewed from the burner side can be reduced.

Since the pressure in the reaction vessel affects the combustion flame or the airflow state inside the chamber, it is necessary to maintain a predetermined pressure inside the vessel, and for this purpose, it is preferable to control the pressure by installing an automated pressure controller (not depicted) downstream from the exhaust outlet 5.

Furthermore, for the gas supplied from the air supply inlets 6 and 7, ambient air which has been passed through a filter is used. Hereinafter, the invention will be described by way of Examples, but the invention is not to be limited to these Examples, and various embodiments can be made.

Example 1

Using the reaction vessel shown in FIG. 1, a porous preform for optical fiber was produced under the following conditions.

2 [m³/min] of air was supplied from the air supply inlet 6 in the upper deposition chamber 2, and 100 [l/min] of air was supplied from the air supply inlet 7 in the lower deposition chamber 3, while 450 [ml/min] of $SiCl_4$ and 25 [ml/min] of $GeCl_4$ were supplied as raw material gases to the core deposition burner 8.

The burners for cladding deposition 9 and 10 were supplied with 1.0 [l/min] and 3.0 [l/min] respectively of $SiCl_4$, as a raw material gas. In addition, each of the burners for deposition was supplied with H2 as a combustible gas and O2 as a combustion supporting gas.

The floor 11 of the upper deposition chamber 2 was installed to be at a height between the lower end of a straight body part 13 and a deposition tip 14 of the porous preform 1. The aperture of the connection opening 12 was set such that when the aperture diameter was designated as A [mm] and the diameter of the porous preform 1 at the part which passes through the connection opening 12 as B [mm], the ratio B/A is in the range of $0.05 \leq B/A \leq 0.6$.

After carrying out the deposition of glass microparticles for 24 hours, the attachment and deposition state of glass microparticles at the ceilings of the top chamber 4 and the upper and lower deposition chambers, and at the connection opening on the wall surfaces, was examined. It was found that the amount of deposition was small at all of the sites, and there was no occurrence of glass microparticles exfoliating and falling off.

When the resulting porous preform 1 was dehydrated and transparently vitrified, air bubbles or foreign materials were not found. When the refractive index distribution of an optical fiber preform thus obtained was measured, the preform had excellent optical properties which were stable in the length direction.

Comparative Example 1

Deposition of glass microparticles was carried out under the same gas conditions as in Example 1. Here, in the case where the floor 11 of the upper deposition chamber 2 was installed at a position higher than the lower end of the straight body part of the porous preform 1, or in the case where the aperture diameter of the connection opening 12 was set such that B/A>0.6, the flame of the core deposition burner was stabilized, but a large amount of excess soot attached and exfoliated in the vicinity of the connection opening. Also, when the preform was transparently vitrified, a large number of air bubbles were generated.

Comparative Example 2

Deposition of glass microparticles was carried out under the same gas conditions as in Example 1. Here, in the case where the floor 11 of the upper deposition chamber 2 was installed at a position lower than the deposition tip part of the porous preform 1, or in the case where the aperture diameter of the connection opening 12 was set such that B/A<0.05, the attached amount of excess soot in the vicinity of the connection opening was suppressed, there was no exfoliation and falling off, and there was no generation of bubbles after transparent vitrification. However, the intrusion of the airflow of the upper deposition chamber 2 into the lower deposition chamber 3 could not be prevented, and the flame of the core deposition burner 8 was severely disturbed. For that reason, when the refractive index distribution was measured, there was a change in the distribution properties in the length direction, and intense striation occurred.

Example 2

The floor 11 of the upper deposition chamber 2 was installed to be at a height corresponding to the middle point between the lower end of the straight body part and the deposition tip of the porous preform, and deposition was carried out under the same gas conditions as in Example 1, at the ratio B/A=0.3, for 24 hours.

Here, the exhaust outlet 5 and the air supply inlet 6 were provided such that the angle θ satisfied the condition 5 degrees≤θ≤50 degrees when the upper end of the air supply inlet 6 provided on the burner side wall was viewed up from the upper end of the exhaust outlet 5 of the upper deposition chamber 2. Then, excess glass microparticles did not float to the ceiling 19 and could not be discharged through the exhaust outlet 5. The thickness of the attachment of glass microparticles to the ceiling 19 on the back of the porous preform when viewed from the burner side, decreased to a large extent from 10 mm in the conventional cases to 2 mm. Furthermore, since glass microparticles do not stay in the lower part of the upper deposition chamber, the attachment to the lower part of the sidewalls of the upper deposition chamber was not seen.

Comparative Example 3

Deposition of glass microparticles was carried out under the same gas conditions as in Example 2. Here, when the exhaust outlet 5 and the air supply inlet 6 were provided such that the angle θ satisfied the condition 5 degrees>θ when the upper end of the air supply inlet on the burner side was viewed up from the upper end of the exhaust outlet of the upper deposition chamber 2, excess glass microparticles floated to the ceiling 19 of the upper deposition chamber 2 until the microparticles were discharged through the exhaust outlet 5, and therefore, a large amount of glass microparticles attached to the ceiling 19, particularly to the ceiling 19 on the back of the porous preform when viewed from the burner side, so that the thickness reached 8 mm.

Comparative Example 4

Deposition of glass microparticles was carried out under the same gas conditions as in Example 2.

Here, when the angle was set to be θ>50 degrees, there were no excess glass microparticles attaching to the ceiling 19, but excess glass microparticles stayed in the lower part of the upper deposition chamber 2, and excess glass microparticles attached to the lower side of the sidewalls of the upper deposition chamber 2, so that the thickness reached 4 mm.

As made clear from the above, the invention contributes to an improvement of the quality of optical fiber preforms and cost reductions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A porous glass preform production apparatus for producing a porous preform, the apparatus comprising a reaction vessel which includes an upper deposition chamber having a first air supply inlet in a first wall and an exhaust outlet in a second wall opposing the first wall, a lower deposition chamber having a second air supply inlet and connected to the upper deposition chamber by a connection opening on a floor of the upper deposition chamber, and a top chamber disposed on top of the upper deposition chamber and adapted to lift and store a porous glass preform formed by deposition, wherein the second wall includes a substantially vertical wall segment above the exhaust outlet and facing the first air supply inlet, an angle of elevation θ from an upper end of the exhaust outlet to an upper end of the first air supply inlet satisfies the expression 5 degrees≤θ≤50 degrees, and the wall segment extends from the upper end of the exhaust outlet to a ceiling of the upper deposition chamber.

2. The porous glass preform production apparatus according to claim 1, wherein a distance from a center of the connection opening to an inner wall of the upper deposition chamber is A or more, where A is an aperture diameter of the connection opening.

3. The porous glass preform production apparatus according to claim 1, wherein a distance from a center of the connection opening to an inner wall of the lower deposition chamber is 0.7 A or more, where A is an aperture diameter of the connection opening.

4. The porous glass preform production apparatus according to claim 1, wherein an inner surface of the connection opening is processed by chamfering or processed to have a curved surface.

5. The porous glass preform production apparatus according to claim 1, wherein the connection opening has a structure separable from the floor of the upper deposition chamber.

6. The porous glass preform production apparatus according to claim 1, wherein gas supplied through the air supply inlets is ambient air which has been passed through a filter.

7. The porous glass preform production apparatus according to claim 1, wherein pressure inside the reaction vessel is controlled by an automated pressure controller installed downstream from the exhaust outlet.

* * * * *